United States Patent [19]

Kennedy

[11] Patent Number: 5,766,953
[45] Date of Patent: Jun. 16, 1998

[54] DETERMINATION OF THE SOURCE OF A SOIL SAMPLE

[75] Inventor: Ann C. Kennedy, Pullman, Wash.

[73] Assignee: The United States of America as represented by the Secretary of the Agriculture, Washington, D.C.

[21] Appl. No.: 843,969

[22] Filed: Apr. 17, 1997

Related U.S. Application Data

[63] Continuation of Ser. No. 548,852, Oct. 25, 1995, abandoned.
[51] Int. Cl.$^6$ .................................................. G01N 33/24
[52] U.S. Cl. .............................. 436/31; 436/25; 436/71; 436/94
[58] Field of Search ........................... 436/25, 31, 71, 436/94

[56] References Cited

U.S. PATENT DOCUMENTS

| 2,712,986 | 7/1955 | Huckabay | 436/71 |
| 4,573,354 | 3/1986 | Voorhees et al. | 436/25 |
| 5,668,719 | 9/1997 | Bobrov et al. | 364/420 |

OTHER PUBLICATIONS

Yamaoka ("Fatty acids in sediments of Sedonaikai; Distribution of Fatty Acids in sediments from Soo Nada"); Nippon Nogei Kagaku Kaishi (1983), 57(5), 439–53. (Abstract).

Al–Saad, et al. "Soures of hydrocarbons & fatty acids in sediment from Hor Al–Hammar Morsh, Shelft Al–Arab, & north-west Arabian (Persian) Gulf"—Mar. Pollut. Bull. (1993), 26(10), 559–64. (Abstract).

Fostic et al. "Principal factors affecting the variation of plant lipids in soil". Agrochimica (1985) 29 (2–3–4), 174–85 (Abstract).

L. Zelles, Q. Y. Bai, T. Beck, and F. Beese. "Signature Fatty Acids in Phospholipids and Lipopolysaccharides as Indicators of Microbial Biomass and Community Structure in Agricultural Soils," *Soil Biol. Biochem.* 24:317–323 (1992).

L. Zelles, R. Rackwitz, Q. Y. Bai, T. Beck, and F. Beese. "Discrimination of Microbial Diversity by Fatty Acid Profiles of Phospholipids and Lipopolysaccharides in Differently Cultivated Soils," in *The Significance and Regulation of Soil Biodiversity*, H. P. Collins, G. P. Robertson, and M. J. Klug (Eds.), Kluwer Academic Publishers, The Netherlands, (1995), pp. 115–122.

D. Parkinson and D. C. Coleman, "Methods for Assessing Microbial Communities, Activity and Biomass," *Agriculture, Ecosystems and Environment* 34:3–33 (1991).

M. Sasser, "Identification of Bacteria by Gas Chromatography of Cellular Fatty Acids," *MIDI Technical Note #101*, MIDI, Newark, DE (1990).

D. C. White and F. E. Frerman, "Extraction, Characterization, and Cellular Localization of the Lipids of *Staphylococcus aureus*," *Journal of Bacteriology* 94:1854–1867 (1967).

(List continued on next page.)

*Primary Examiner*—Jill Warden
*Assistant Examiner*—Sharidan Carrillo
*Attorney, Agent, or Firm*—M. Howard Silverstein; John D. Fado; Margaret A. Connor

[57] ABSTRACT

Methods to determine the geographic sources of soil samples are described. A biological fingerprint profile of the sample is determined. The profile is compared to a library which is constructed of datasets which relate biological profiles and geographic locations of soil samples. The invention provides a tool for identification of pollution sources of soil origin.

3 Claims, 8 Drawing Sheets

OTHER PUBLICATIONS

S. K. Haack, H. Garchow, D. A. Odelson, L. J. Forney, and M. J. Klug, "Accuracy, Reproducibility, and Interpretation of Fatty Acid Methyl Ester Profiles of Model Bacterial Communities," *Applied and Environmental Microbiology* 60:2483–2493 (1994).

A. C. Kennedy, "Carbon Utilization and Fatty Acid Profiles for Characterization of Bacteria," in *Methods of Soil Analysis, Part 2, Microbiological and Biochemical Properties*, R. Weaver and J. S. Angle (Eds.) Soil Science Society of America, Madison, WI, (1994), pp. 543–556.

L. T. Miller, "Single Derivatization Method for Routine Analysis of Bacterial Whole–Cell Fatty Acid Methyl Esters, Including Hydroxy Acids," *Journal of Clinical Microbiology* 16:584–586 (1982).

H. Bolton, Jr., L. F. Elliott, R. I. Papendick, and D. F. Bezdicek, "Soil Microbial Biomass and Selected Soil Enzyme Activities: Effect of Fertilization and Cropping Practices," *Soil Biol. Biochem.* 17:297–302 (1985).

M. A. Cavigelli, G. P. Robertson, and M. J. Klug, "Fatty Acid Methyl Ester (FAME) Profiles as Measures of Soil Microbial Community Structure," in *Significance and Regulation of Soil Biodiversity*, H. P. Collins, G. P. Robertson, and M. J. Klug (Eds.), Kluwer Academic Publishers, The Netherlands, (1995), pp. 99–113.

D. G. Fraser, J. W. Doran, W. W. Sahs, and G. W. Lesoing, "Soil Microbial Populations and Activities under Conventional and Organic Management," *J. Environ. Qual.* 17:585–590 (1988).

5,766,953

DETERMINATION OF THE SOURCE OF A SOIL SAMPLE

This application is a continuation, of application Ser. No. 08/548,852, filed Oct. 25, 1995, now abandoned.

BACKGROUND OF THE INVENTION

1. Field of the Invention

The present invention relates to methods to determine the source of soil particles. More particularly, the invention relates to use of a biological profile of a soil sample to identify the geographic source of the soil sample.

2. Description of the Art

Air and water pollution negatively affect offsite areas causing billions of dollars in damage in the United States annually. The health impact of particulate matter away from the source can be quite dramatic, and particulate matter has been implicated in adverse effects on human health. Pollution prevention and control costs over $1 billion annually, and to be successful requires accurate identification of the origins of displaced materials. Of particular interest by the Environmental Protection Agency is the monitoring and control of particulates of size 10 microns (PM-10) and smaller. The many sources of PM-10 material include vehicle exhaust, emissions from woodburning stoves, industrial emissions, road dust, and wind-blown dust from agricultural fields and operations. Chemical composition and particle size distribution are currently used to identify pollution sources of nongeological origin, but are not successful in accurately identifying sources of geological materials such as soils.

Methods to identify sources of particulates of geologic origin are needed. This is because water and air quality are negatively affected by displaced soil or dust particulates. Soil is being lost in wind and water at a rate of 7.5 billion metric tons per year (Myers, N., Gaia: *An Atlas of Plant Management*, Anchor Doubleday, Garden City, N.Y. (1993) ). This alarming rate of loss not only reduces agricultural production and leads to deforestation, but is causing serious pollution problems due to deposition of displaced soil. In order for pollution abatement procedures to be successful the source of the material needs to be identified, and the success of control measures needs to be determined. Because current technology does not enable identification of the nonpoint sources of pollution where control measures are needed, water and air quality problems resulting from displaced soil or dust particulates are mainly unresolved. The current practice of treating broad areas (watershed or larger scale) to control agricultural nonpoint pollution is not cost effective, and often fails to achieve desired air or water quality improvements. What is needed are methods for accurate identification of the origin of displaced soil material. Such methods are essential for successful pollution control measures.

SUMMARY OF THE INVENTION

The present invention relates to methods to determine the source or sources of soil particles. More particularly, the invention relates to use of a biological profile of a soil sample to identify the geographic source or sources of the sample.

Surprisingly, it has been discovered that soils from different geographic locations show unique biological profiles which can be used as fingerprints to identify the source of soil samples. To identify the geographic source of a soil sample, the sample is treated to obtain a biological profile of the sample. Then the profile is compared to a library which is constructed of datasets which relate biological profiles and geographic origin of soil samples.

This new source detection technology is useful to target nonpoint pollution as well as point sources, and provides a powerful tool for the development of policies for pollution control that are more effective than in the past, and that are fair to farmers, developers, and other land users. Further, it fills an important need to identify sources of PM-10 material of soil origin.

In accordance with this discovery, it is an object of the invention to provide methods to identify the geographic sources of soil samples.

Another object of the invention is the provision of methods of constructing a library which relates biological profiles of soil samples with their associated geographical locations.

A further object of the invention is the provision of methods of biological analysis to fingerprint soil samples to identify the source or sources of the material.

An even still further object of the invention is to provide methods to identify sources of soil particulates that pollute air or water.

Other objects and advantages of the invention will become readily apparent from the ensuing description.

DETAILED DESCRIPTION OF THE INVENTION

Figure 1:
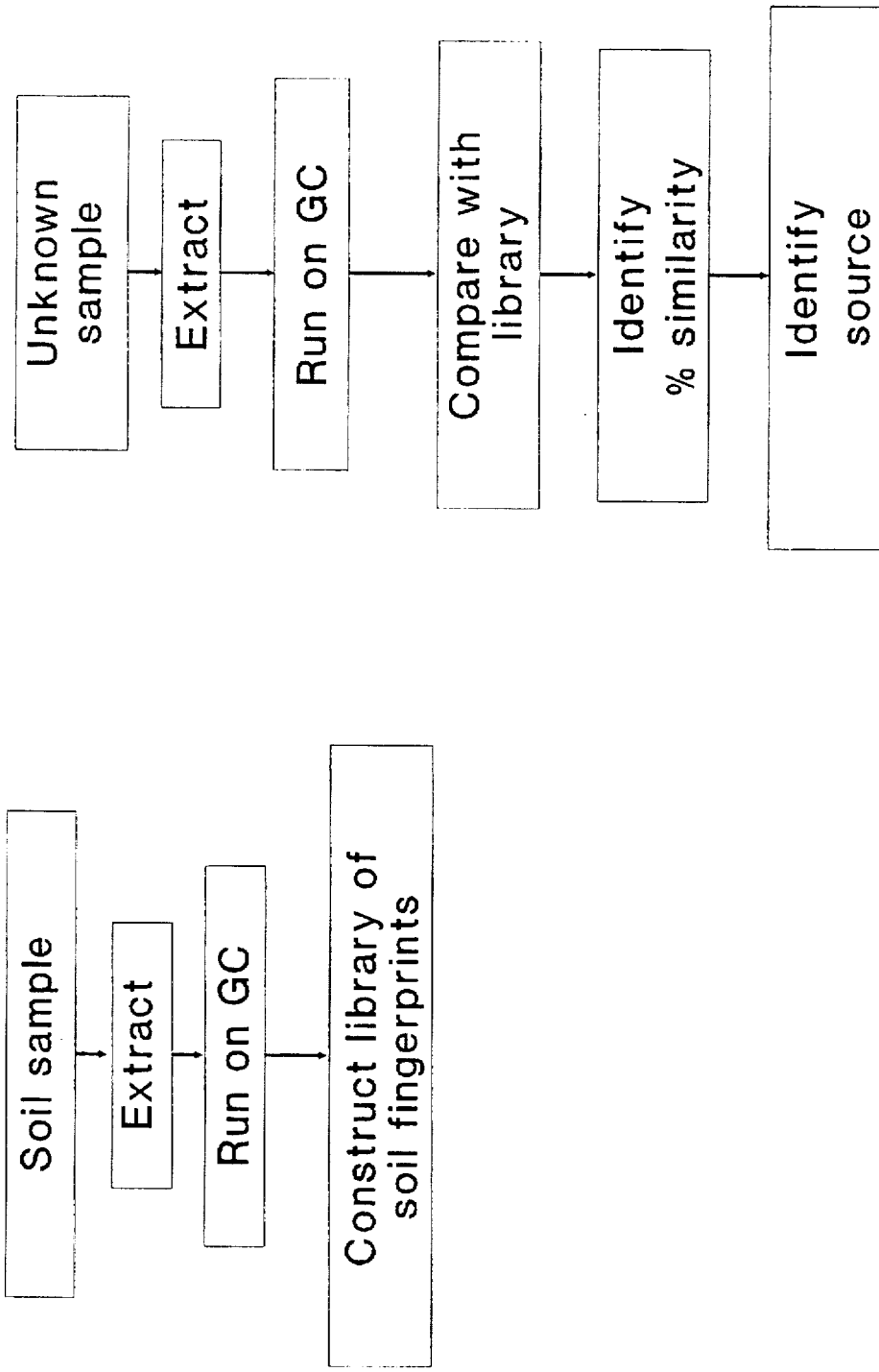
FIG. 1 is a flow diagram of steps to identify a test sample source.

The present invention provides methods to determine the source or sources of a soil sample. Soil is a complex composition or medium which contains particulate matter, including, inorganic particulate matter such as particles of sand, silt, and clay, and particles of living and dead organic matter such as macroorganisms, communities of microorganisms, and plant material. Prior to the present discovery, it was believed that the parent material or mineral components of the soil was the greatest influence in determining the character of a soil. The parent material of soil is defined as the unconsolidated and more or less chemically weathered mineral or organic matter from which the solum (the upper and most weathered part of the soil profile) is developed by pedogenic processes. Surprisingly, it has been discovered that the biological portion of the soil imparts a unique characteristic to the soil. Thus, soil from a particular source has a unique biological profile which can be used as a fingerprint to identify the source of an unknown soil sample. Further, this unique biological profile of the soil is maintained even after it is displaced to another location.

Molecular fingerprinting of the biologic constituents in a soil sample or soil-containing sample is carried out to define the biological characteristics in the sample. While not being bound by theory, it is theorized that the individual particles in the soil (which include the organic and inorganic particles) in combination with environmental factors such as water, temperature, and ultraviolet radiation (sunshine), influence the development of the biological portion of a soil sample. Thus, a soil sample from a particular source forms a unique biological profile. Moreover, the biological profile is maintained, even after the soil sample has been displaced to another location. Thus, the source of a soil sample can be identified by comparing the biological profile of the sample to a library constructed of datasets which relate biological profiles and geographic origin of soil samples.

For purposes of this invention, the term "soil sample" includes samples of agricultural soils, or other soil-containing samples, for example, sediment, road dust, and the like. The test soil sample can be obtained from any location, including for example, air, water, sediments, fields, and roads. Biological profile of the sample, as used herein, describes a representation of an organism or system that is or once was living using certain characteristics of that system. These characteristics can include life processes, structure, function or growth parameters, for example, genetic or biochemical analyses. Biological analysis of the sample soil is used to differentiate soil samples and identify sources of the sample. Several methods can be utilized to identify biological profiles (biomarkers) and to manipulate the fingerprint profile data. Such biological analyses include, for example, analysis of individual biological components, including fatty acid profiles and nucleic acid profiles, e.g., DNA sequence analysis.

In the method of the invention soil samples or soil-containing samples are collected and analyzed to obtain a biological profile. The profile is compared to profiles in a library of soil sample profiles of known geographic origin. Thus, specific source areas (e.g., fields, construction sites) of soil particulates that pollute air or water, or result in fallout or deposition can be identified. Additional data may be included in the library such as agronomic zone and management practices to provide further information about the sample.

With molecular techniques, such as fatty acid analysis and nucleic acid analysis, it is possible to obtain 'fingerprints' of the biotic portion of the soil. For example, these molecular techniques are able to indicate microbes in very small samples, as sensitivity can be maintained in amounts as small as a nanogram. It is not necessary for the microbes to be alive to be characterized, since no culturing is needed for these techniques.

One exemplary way to determine a biological profile of a soil sample to obtain a fingerprint that is characteristic and unique to a given soil at a given time is lipid analysis. Lipids consist of free fatty acid hydrocarbons, fatty alcohols, and other compounds of bound fatty acids which include phospholipids, peptidolipids, and glycolipids. Most of the data collected on lipid composition has concentrated on the fatty acids. Fatty acids can be extracted and esterified with methanol to form fatty acid methyl esters (FAMEs) by several different methods (Kennedy, 1994, *Methods of Soil Analysis*, Part 2, *Microbiological and Biochemical Properties*, R. Weaver and J. S. Angle (Eds.), Soil Science Society of America, Madison, Wis. pages 543–556.; White, D. C. and Frerman, F. E., *J. Bacteriol.* 94:1854–67 (1967); Miller, L. T., *J. Clin. Microbiol.* 16:584–586 (1982)). These FAMEs can then be analyzed quantitatively and qualitatively by high-resolution fused-silica capillary gas chromatography. This technique is useful for processing large numbers of samples because it is rapid and can be automated.

Fatty acid analysis can be used to determine the source of sediment and particulate material in air, soil, and water that has been displaced by wind or water erosion. Samples of soil, water, or air are collected, extracted, and analyzed by gas chromatography. A method for producing fatty acid methyl-esters (FAMEs) of soil samples is described in detail in Example 1, below.

Fatty acid analysis for source identification requires that a library of known samples be established for comparison with unknown samples. The sequence of steps utilizing fatty acid analyses for source identification including a comparison of the fingerprint from the test sample with the fatty acid fingerprints from library samples is shown in FIG. 1. A 'library' of fatty acid fingerprints for soils of the Columbia Plateau area has been prepared. This is described in detail in Example 2, below. Since different soils have distinct biological profiles, the present invention provides a means to identify the sources of soil material.

Multivariate analysis of fingerprints and variables indicated that clusters of fatty acid fingerprints were significantly dependent upon organic matter, agronomic zone and elevation taken together. No variable alone could explain the fingerprint patterns. As discussed in detail in Example 3, below, the invention can not only differentiate among soils, it can separate out soils based on major management differences as well. Further, as discussed in Example 3, below, the invention can be used to discern proportions of soil from samples containing combinations of different soil samples such as soil and road dust. Additionally, it was found that fingerprint profiles maintained the characteristic soil fatty acid profile over time and with storage.

EXAMPLES

The following examples are intended only to further illustrate the invention and are not intended to limit the scope of the invention which is defined by the claims.

Example 1

This example describes fatty acid analysis of soil samples.

One gram of soil was added into an acid-washed screw-capped glass tube (13 mm). The soil and microbial cells were hydrolyzed using 1 mL sodium hydroxide (15% wt/vol) in 50% methanol and saponified at 100° C. for 30 minutes. The tube was quickly cooled and then acidified and methylated with 2 mL HCl in aqueous methanol at 80° C. for 10 minutes. The fatty acid methyl esters were extracted by mixing with 1.25 mL of a 1:1 mixture of hexane/methyl-tert butyl ether on an end-over-end mixer for 10 minutes, then centrifuged at 3,000 rpm for 1 minute. The organic phase was removed, a second volume of hexane/methyl-tert butyl ether was added to the soil tube with a flamed Pasteur pipet, mixed, and the organic phases combined. The organic phase was washed with dilute NaOH (1% wt:vol) on an end-over-end mixer for 5 minutes. Using a Pasteur pipet, the organic phase was placed in a glass vial and allowed to concentrate by evaporation. The sample was injected onto a 25 mm ×0.2 mm fused silica capillary column in a gas chromatograph (5890 GC Series II, Hewlett Packard) equipped with a flame ionization detector. It was found that fatty acid profile analyses of various soils exhibited unique patterns depending on their origin. Table 1 shows raw fatty acid profile data. The fatty acid fingerprint of an unknown was compared to a library of fingerprints from known samples to identify the sources of the unknown material.

from that location in four directions. Surface soil samples were used. These samples were collected from the surface layers of the soil.

The fatty acid profile for each sample was obtained as described in Example 1. A library of fatty acid profiles for soils of the Columbia Plateau area was assembled. Each data

TABLE 1

ID: 1483     COLFAX (3-24-95  
Bottle: 54     SAMPLE    [EUKARY]  
DATAS:F95330528 05-OCT-95 10:30:12  
Date of run: 30-MAR-95 15:35:13  
Date edited: 05-OCT-95 10:29:16

| RT | Area Ar/Ht | Respon | ECL | Name | % | Comment 1 | Comment 2 |
|---|---|---|---|---|---|---|---|
| 0.000 | 261746688 0.033 | ... | 3.101 | SOLVENT PEAK | ... | < min rt | |
| 2.006 | 4104 0.023 | ... | 7.595 | | ... | < min rt | |
| 2.075 | 464 0.028 | ... | 7.750 | | ... | < min rt | |
| 2.129 | 600 0.026 | ... | 7.871 | | ... | < min rt | |
| 2.319 | 4576 0.025 | ... | 8.298 | | ... | < min rt | |
| 2.632 | 696 0.043 | 1.288 | 9.001 | 9:0 | 1.02 | ECL deviates 0.001 | Reference 0.004 |
| 2.985 | 1088 0.027 | ... | 9.793 | | ... | | |
| 4.101 | 1160 0.035 | 1.137 | 11.493 | C12 Primary Alcohol | 1.50 | ECL deviates 0.003 | |
| 4.516 | 4360 0.034 | 1.112 | 11.997 | 12:0 | 5.51 | ECL deviates −0.003 | Reference −0.002 |
| 4.734 | 944 0.036 | 1.103 | 12.207 | C9 Dicarboxylic acid | 1.18 | ECL deviates −0.006 | |
| 6.406 | 1656 0.040 | ... | 13.669 | | ... | | |
| 6.823 | 3312 0.039 | 1.034 | 14.000 | 14:0 | 3.89 | ECL deviates −0.000 | Reference −0.002 |
| 7.720 | 1128 0.044 | 1.015 | 14.623 | 15:0 Iso | 1.30 | ECL deviates 0.002 | Reference 0.000 |
| 7.850 | 1144 0.042 | 1.012 | 14.713 | 15:0 Anteiso | 1.32 | ECL deviates 0.002 | Reference 0.000 |
| 7.945 | 11472 0.044 | 1.011 | 14.779 | 15:1 w9c | 13.17 | ECL deviates 0.007 | |
| 9.552 | 3328 0.053 | 0.985 | 15.816 | 16:1 w7c | 3.72 | ECL deviates −0.001 | |
| 9.697 | 1096 0.054 | 0.983 | 15.908 | 16:1 w5c | 1.22 | ECL deviates −0.001 | |
| 9.842 | 6960 0.045 | 0.981 | 15.999 | 16:0 | 7.75 | ECL deviates −0.001 | Reference −0.003 |
| 10.465 | 2360 0.051 | 0.973 | 16.374 | 17:1 Alcohol (w8?) | 2.61 | ECL deviates 0.003 | |
| 11.189 | 12816 0.052 | 0.965 | 16.810 | 17:1 w7c | 14.05 | ECL deviates −0.009 | |
| 12.487 | 1072 0.060 | 0.954 | 17.576 | 18:3 w6c | 1.16 | ECL deviates 0.002 | |
| 12.729 | 2056 0.050 | 0.952 | 17.718 | 18:2 w6c | 2.22 | ECL deviates −0.001 | |
| 12.815 | 3976 0.054 | 0.951 | 17.768 | 18:1 w9c | 4.30 | ECL deviates 0.001 | |
| 12.905 | 1864 0.054 | 0.951 | 17.821 | 18:1 w9t | 2.01 | ECL deviates −0.004 | |
| 13.208 | 1480 0.050 | 0.949 | 17.998 | 18:0 | 1.59 | ECL deviates −0.002 | Reference −0.004 |
| 14.652 | 10256 0.053 | 0.940 | 18.845 | 19:1 w8t | 10.95 | ECL deviates −0.000 | |
| 15.370 | 2264 0.058 | 0.937 | 19.267 | 18:0 20H | 2.41 | ECL deviates 0.003 | |
| 16.608 | 1048 0.056 | 0.932 | 19.996 | 20:0 | 1.11 | ECL deviates −0.004 | Reference −0.005 |
| 17.588 | 1512 0.053 | 0.930 | 20.587 | Unknown 20.588 | 1.60 | ECL deviates 0.001 | |
| 17.665 | 2336 0.053 | 0.930 | 20.633 | 21:0 Iso | 2.47 | ECL deviates −0.004 | |
| 18.069 | 6336 0.059 | ... | 20.876 | | ... | | |
| 18.290 | 2200 0.065 | 0.929 | 21.010 | 21:0 | 2.32 | ECL deviates 0.010 | Reference 0.009 |
| 18.692 | 1736 0.086 | 0.929 | 21.257 | Unknown 21.252 "C". | 1.83 | ECL deviates 0.005 | |
| 19.528 | 3696 0.055 | 0.928 | 21.771 | 22:1 w9c | 3.90 | ECL deviates −0.003 | |
| 19.892 | 1344 0.055 | 0.928 | 21.995 | 22:0 | 1.42 | ECL deviates −0.005 | Reference −0.005 |
| 21.358 | 1312 0.064 | ... | 22.925 | | ... | | |
| 21.927 | 1232 0.071 | 0.930 | 23.294 | Unknown 23.283 "C". | 1.30 | ECL deviates 0.011 | |
| 22.767 | 1152 0.067 | ... | 23.841 | | ... | | |
| 23.804 | 1792 0.060 | ... | 24.536 | | ... | | |
| 24.438 | 1320 0.059 | ... | 24.964 | | ... | | |
| 25.460 | 1120 0.071 | 0.936 | 25.637 | 24:0 30H | 1.19 | ECL deviates −0.003 | |

| Solvent Ar | Total Area | Named Area | % Named | Total Amnt | Nbr Ref | ECL Deviation | Ref ECL Shift |
|---|---|---|---|---|---|---|---|
| 261746688 | 104624 | 89968 | 85.99 | 88062 | 10 | 0.004 | 0.004 |

SOILS1 [Rev 1.0] COLFAX .................... 0.391

Example 2

This example describes the construction of a library which contains biological profiles of soil samples from known geographic locations, and use of the library to identify the source of a test soil sample. The area of interest chosen for this study was the Columbia Plateau of eastern Washington State, an area of approximately 30,000 square miles.

Soil samples were obtained from 30 sites across the Columbia Plateau. The area of interest was divided into a grid pattern and sample sites were selected on the grid. To obtain a representative sample for a location, material was sampled from the selected locations and 100 meters away set contained the fatty acid profile for a sample and its associated geographic location.

The data were further analyzed using a pattern recognition program (Sasser, MIDI Technical Note #101, MIDI, Newark, Del. (1990)) to recognize similarities and differences among the fatty acid fingerprint profiles. Dendrograms were constructed to illustrate the relative relationships among samples. Principal component analysis was conducted using a correlation matrix. Principal component analysis is a type of multivariate analysis that uses a matrix system to compare similarities and differences between a sample and a designated principal component.

Figure 2:
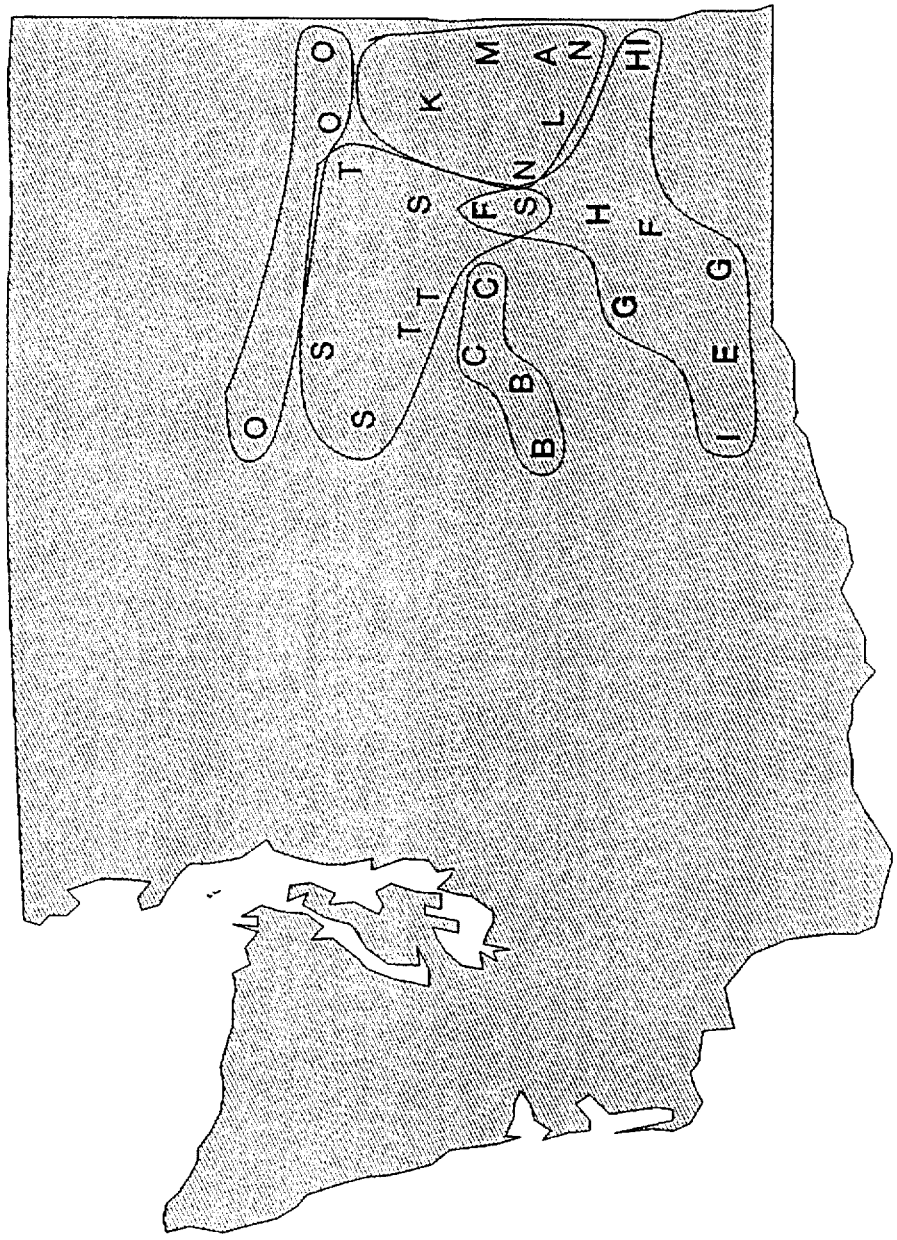
FIG. 2 shows biological groupings across the Columbia Plateau that were determined using the method of the invention.

Results. The fingerprints from samples taken from various counties and climatic zones were unique and could be separated from one another. Letters were used to distinguish among profiles as determined by cluster analysis. In our study, profiles having a Euclidean distance less 4.0 on the dendrogram were given the same letter. Those profiles that were similar but had a Euclidean distance greater than 4.0 were given letters close in the alphabet. Groups were assigned as determined by clusters of neighboring letters in the alphabet. As can be seen in FIG. 2, fingerprints that clustered together separated into five groups across the sample area. These were the southern, northern areas of the Columbia Plateau, Lincoln County, the Palouse, and a small band of soils associated with the Black Sands.

Figure 3:
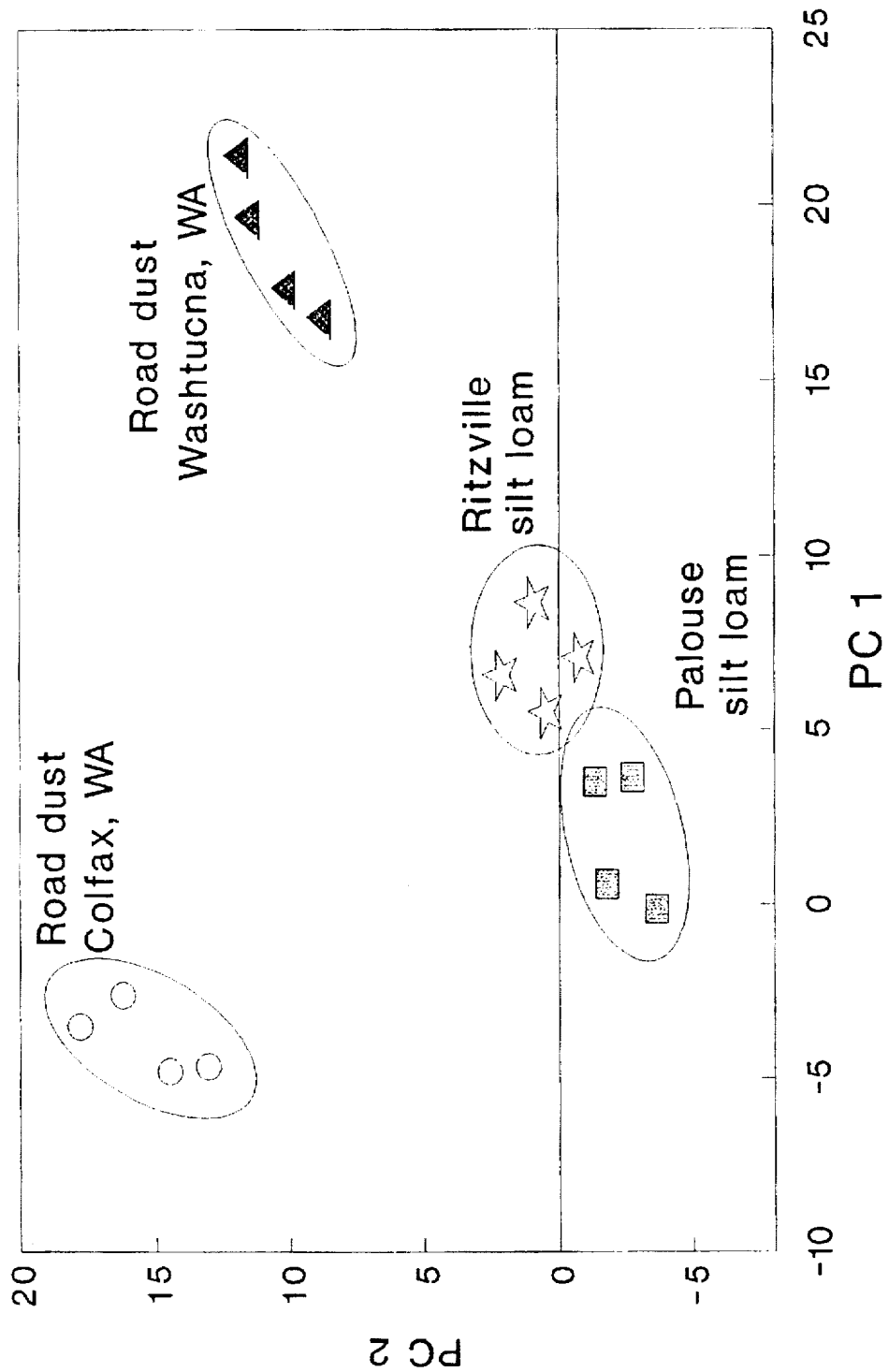
FIG. 3 is a principal component plot of the distribution of two road samples and two cultivated field samples.

The fatty acid fingerprints from samples taken from road sites were dissimilar from those obtained from agricultural sites (FIG. 3). Principle component analysis (PCA) was used to visualize the relationship among several samples (Romesburg, H. C. *Cluster Analysis for Researchers*, Lifetime Learning Publications, Belmont, Calif., 1985; p 37.). When compared using PCA, samples from each sampling site clustered together, indicating greater similarity of fatty acid profiles from within a site. Road dust samples were dissimilar from one another and from agricultural soil samples as indicated by their grouping. The cultivated soils, although slightly dissimilar from one another, clustered together.

Example 3

This example describes studies to ascertain the affects of time, management practices, soil combinations, and storage on the fingerprint profiles of the samples.

Time. Studies to determine possible differences over time were carried out. Four sites in the area of interest were sampled over a 1 year period to ascertain variability over time. Slight differences in the fingerprint profiles were observed for samples taken at different times. However, the profiles were similar enough such that the samples remained in the same letter group.

Management Practices. Differences in management practices on the soil samples were also observed. Three sites (not shown on FIG. 2) from the original 30 exhibited unique fingerprints that did not directly align with any of the other sites. These three sites differed from the others either in their management or their history. While the majority of the soils were from cultivated, nonirrigated sites in various rotations, one of the three sites that did not directly align with any other site was irrigated. A second site which did not align was in the Conservation Reserve Program and had been planted in grass for an extended period of time (7–10 years). The third site had been a Ponderosa pine forest before being cultivated, while all the other sites were in tall grass prairie before cultivation. The technique of the invention not only differentiated among soils, it also separated out soils based on major management differences as well.

Figure 4:
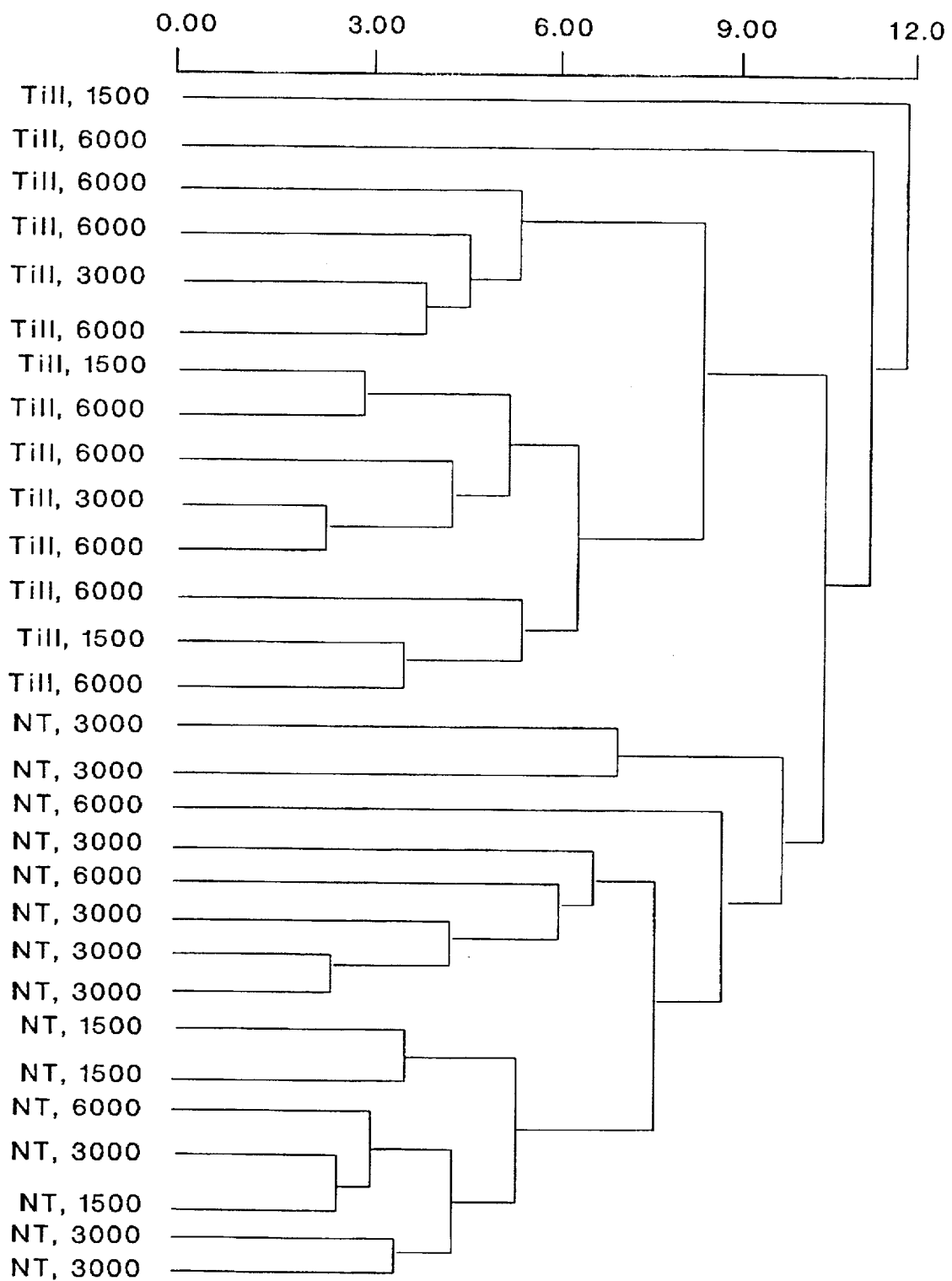
FIG. 4 is a dendrogram of relationships among tillage and residue treatments.

In a separate study, management systems of No-till and conventional till were compared. Varying residue levels were also studied. Fatty acid fingerprints segregated the soil samples by tillage (FIG. 4). Dendrograms of the fatty acid profiles showed close linkage among similar residue levels within tillage systems.

Figure 5:
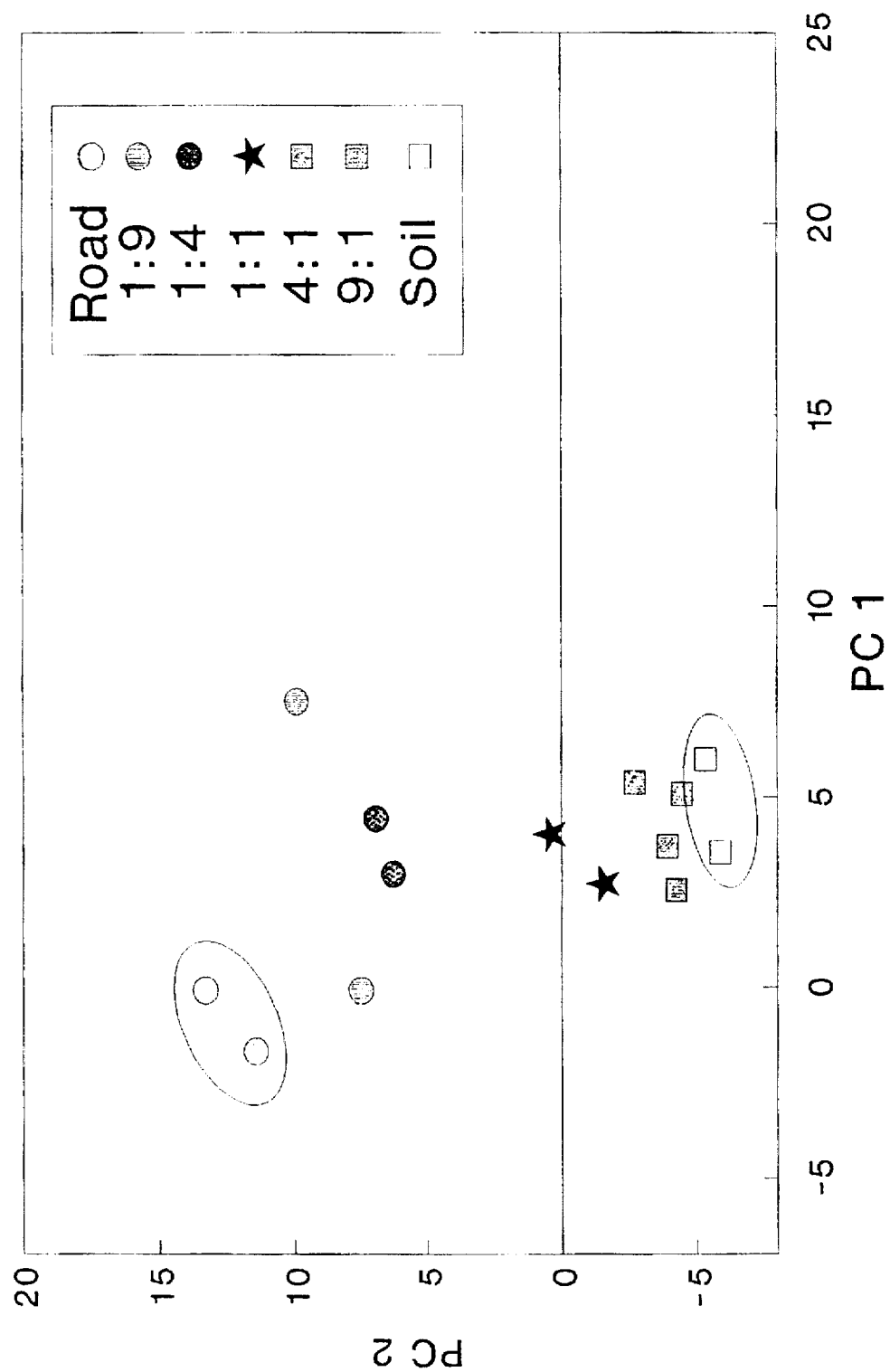
FIG. 5 is a principal component analysis of fingerprints of soil:road combinations.
Figure 6:
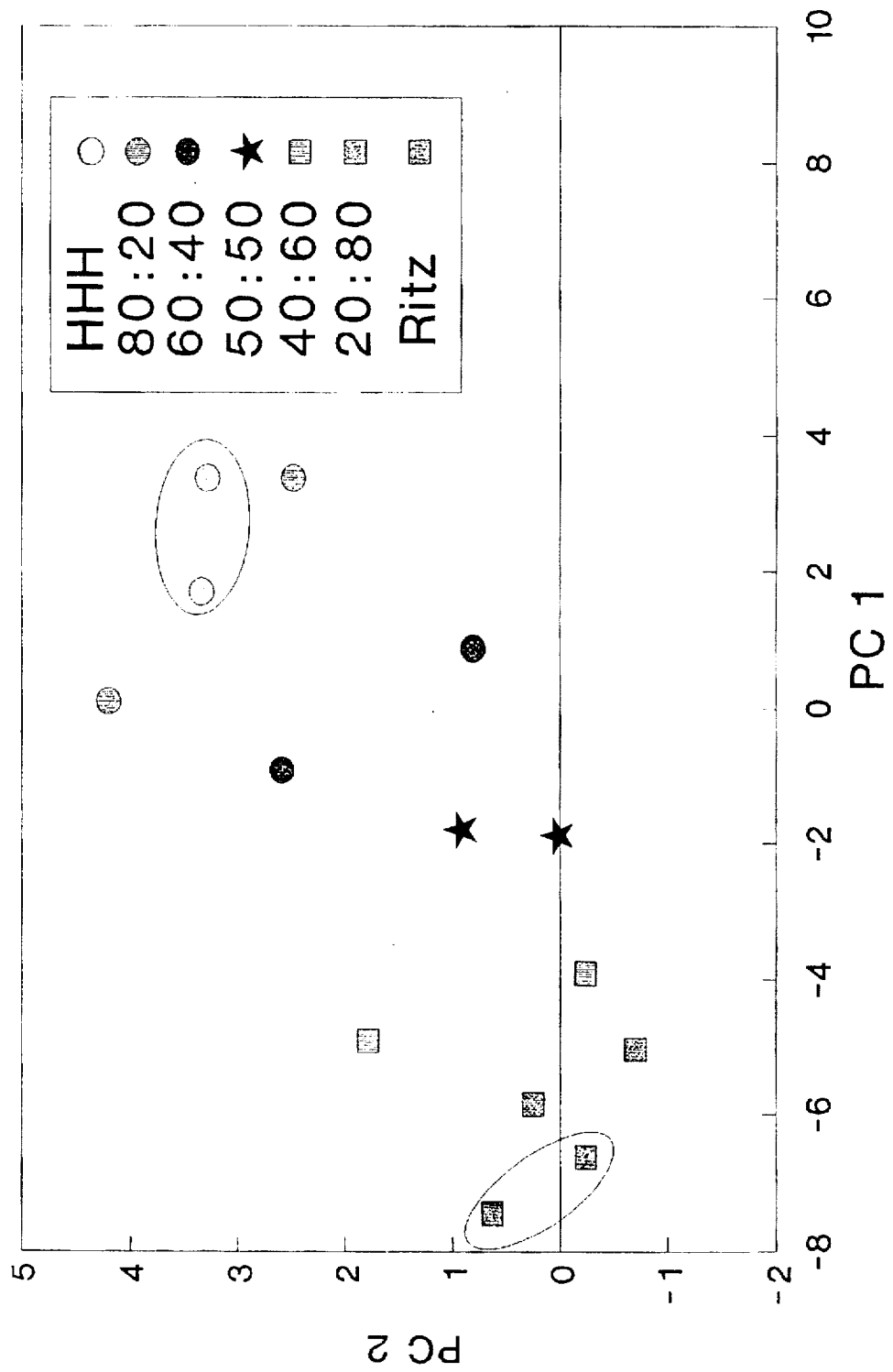
FIG. 6 is a principal component plot of fatty acid fingerprints of soil combinations.

Soil combinations. Combinations of soil material were also studied. Material from the various soil samples were combined in various proportions to determine the success of discerning soil combinations. Soils were combined in various proportions and then analyzed for fatty acid profiles to determine if unique profiles would result. It was found that the fatty acid analysis combined with PCA could discern proportions of soil and road dust (FIG. 5). Some of the combination samples were road samples. In addition to soil particles, these samples contained nonsoil particles. To obtain a road sample, the top 3 cm of material was removed and the underlying 3 to 6 cm of material was collected. Samples with higher levels of road dust were most similar to road dust pattern, while those with higher soil concentrations clustered closer to the soil profile. Soil had a greater influence on the position of a sample in the PCA than did road dust. For example, if the soil content in a sample was 40% (w:w) or greater, the PCA of that sample clustered closer to soil at 100% than to the road dust, however this phenomenon warrants further investigation. In previous comparisons of soil and road samples, it was found that soil had a greater influence on the positioning of a sample than did road samples. When two soil samples were used in a comparison, both soils could be discerned in the various designated proportions (FIG. 6). Using the MIDI pattern recognition program (Sasser, MIDI Technical Note #101, MIDI, Newark, Del. (1990)), an estimation of the proportion of a known soil found is possible.

Figure 7:
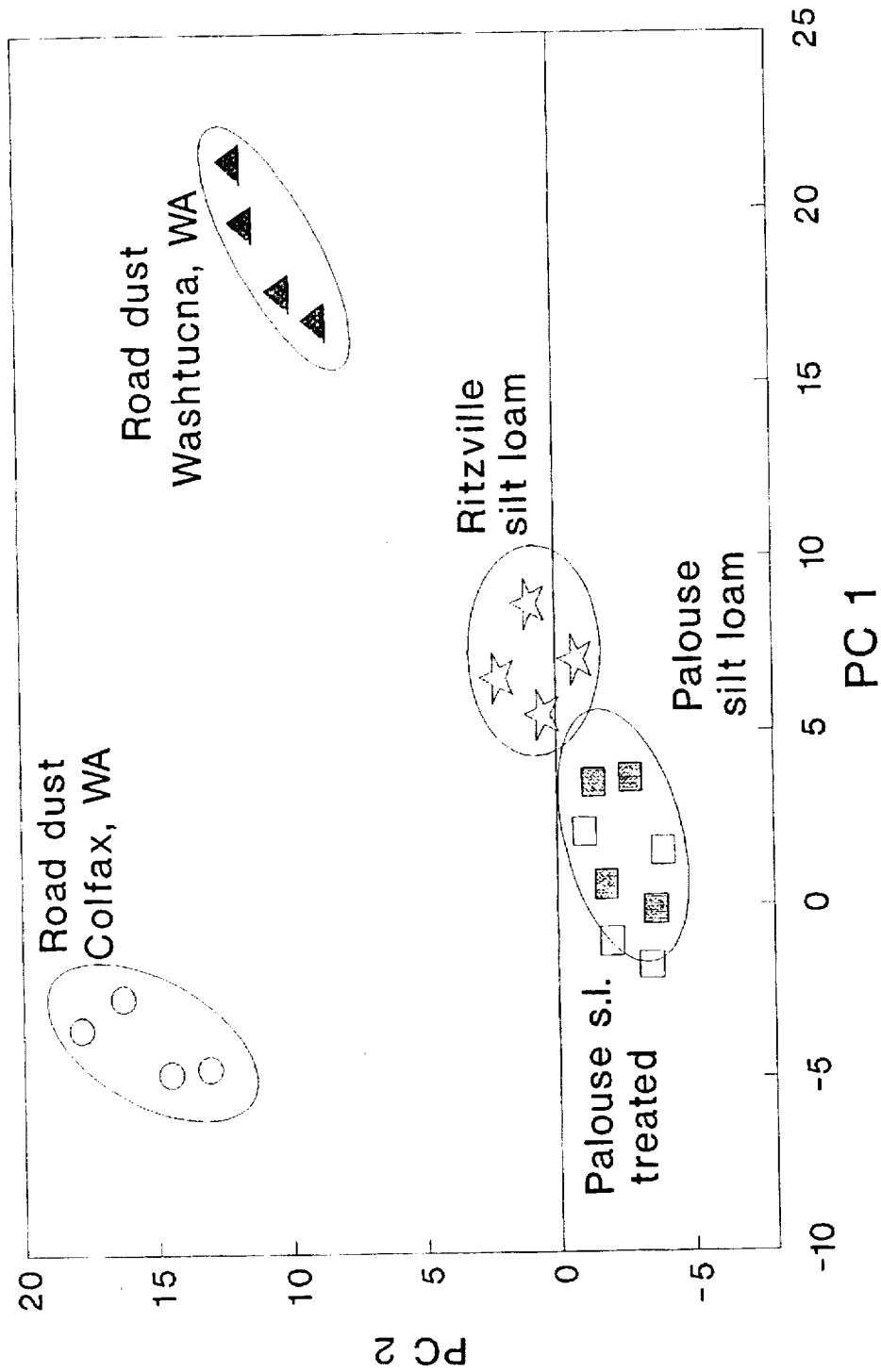
FIG. 7 is a principal component analysis of fingerprints of soil and road samples.

Storage. Samples were studied to ascertain differences due to storage. Although fingerprint profiles were altered with storage, those changes were small and were not dramatic enough to change the relative positioning of the profiles in PCA. After 24 hours at 37° C., Palouse silt loam samples were similar to samples stored at ambient room temperature (FIG. 7). Sample handling maintained the characteristics of soil fatty acid profile and did not alter a profile enough to change it to another soil type.

Example 4

Figure 8:
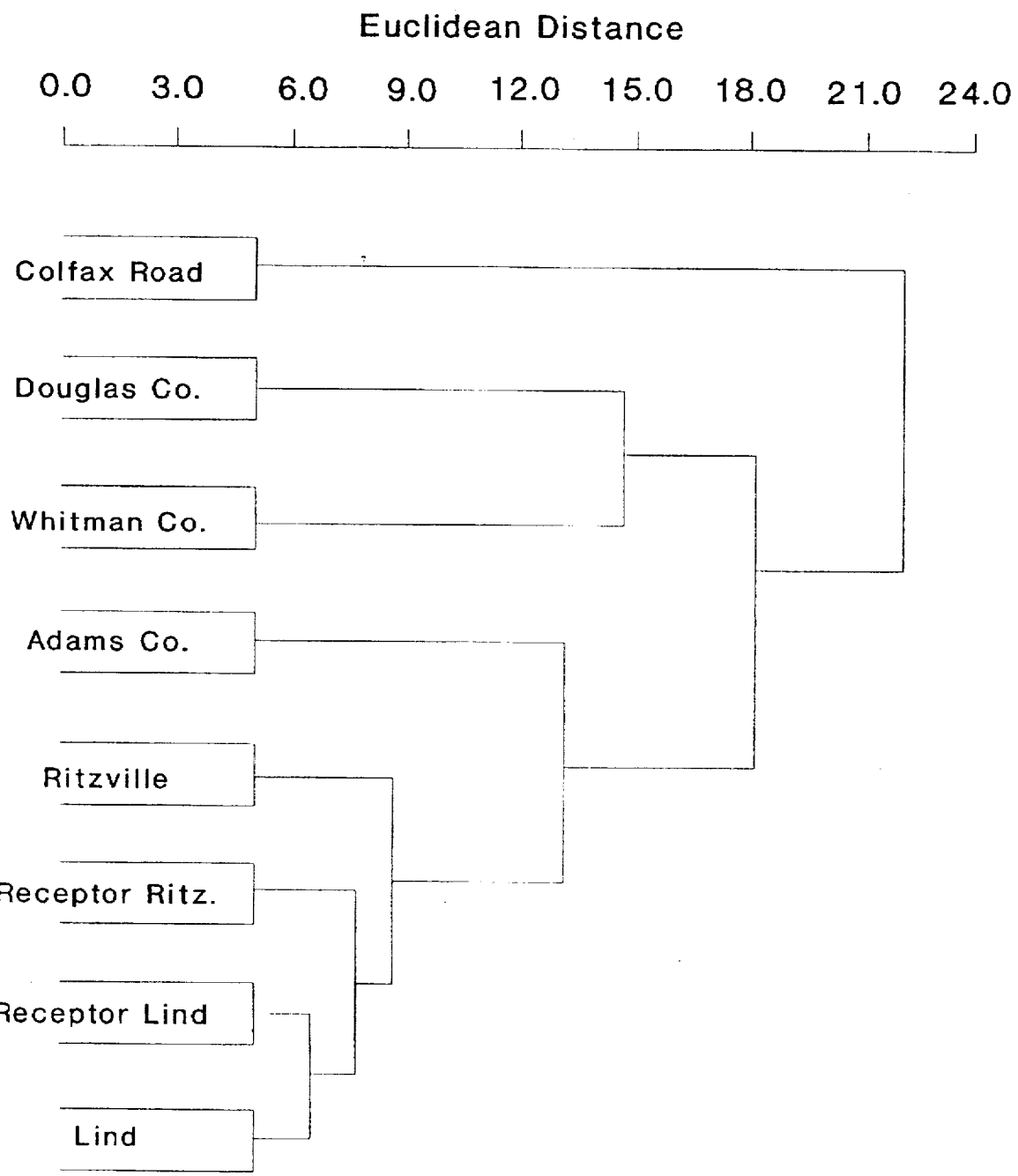
FIG. 8 is a dendrogram of Columbia Plateau soil and receptor fatty acid fingerprints.

Fatty acid analysis was used to analyze the composition of dust on filter receptors. The results showed that the soil on filters from receptors located at Lind and Ritzville had fingerprints closely related to soils from those two locations and were dissimilar from other Washington state soils (FIG. 8). The Lind site fingerprint clustered closer to Lind site sample than any other sample, indicating a high similarity to Lind site soil. The Ritzville filters were similar to Lind and Ritzville soil indicating a mixture of those soils on the filter. Multiple analyses showed that the analyses were reproducible.

Example 5

This example describes nucleic acid analysis of soil samples to identify the source of an unknown soil sample.

DNA was extracted from soil by microwave lysis of cells. Nucleic acid molecules were amplified using the polymerase chain reaction (PCR). The primers used for PCR were those of nitrifying bacteria. This group of bacteria were selected as a target group because of their low diversity and their chemolithotrophic nature. Direct sequencing of DNA or RNA amplified from soil created a fingerprint of the target bacterial communities in soil. Sequences or profiles generated in this manner could distinguish among soils.

To determine the source of a test sample, the nucleic acid fingerprint of the sample is compared to a library constructed of datasets which relate nucleic acid fingerprints and geographic origin of soil samples.

It is understood that the foregoing detailed description is given merely by way of illustration and that modification and variations may be made within without departing from the spirit and scope of the invention.

What is claimed is:

1. A method to determine ane originating geographic location of soil displaced by wind water from said originating location, which comprises:

(a) obtaining a biological profile of said displaced soil, and (b) determining said originating location by comparing said biological profile of said displaced soil with biological profiles in a biological profile library;

wherein library is created by a method comprising obtaining biological profiles of soils originating from plurality of geographic locations that includes said displaced soil's originating location, wherein said plurality of locations includes locations that are spaced from one another by a plurality of miles, and wherein said biological profile at each of said locations is ascertained by analyzing a plurality of spaced apart soil samples from each of said locations.

2. The method of claim 1, wherein said biological profile is selected from the group consisting of a fatty acid profile and a nucleic acid profile.

3. The method of claim 1 wherein said displaced soil is collected on a filter receptor.

* * * * *